United States Patent [19]
Pentel

[11] Patent Number: 5,969,968
[45] Date of Patent: Oct. 19, 1999

[54] REMOTE ORDERING SYSTEM FOR RESTAURANT DRIVE-UP LANE

[76] Inventor: Randolph M. Pentel, 815 Deer Trail Ct., Mendota Heights, Minn. 55118

[21] Appl. No.: 09/062,093

[22] Filed: Apr. 17, 1998

[51] Int. Cl.$^6$ ..................................................... G06F 15/24
[52] U.S. Cl. .......................... 364/405; 364/401; 235/381
[58] Field of Search ................................... 364/405, 401; 235/381

[56] References Cited

U.S. PATENT DOCUMENTS

| | | |
|---|---|---|
| 4,300,040 | 11/1981 | Gould et al. . |
| 4,414,467 | 11/1983 | Gould et al. . |
| 4,449,186 | 5/1984 | Kelly et al. ............................. 364/407 |
| 4,654,482 | 3/1987 | DeAngelis . |
| 4,722,053 | 1/1988 | Dubno et al. . |
| 5,128,862 | 7/1992 | Mueller . |
| 5,235,509 | 8/1993 | Mueller et al. . |
| 5,319,542 | 6/1994 | King, Jr. et al. . |
| 5,353,219 | 10/1994 | Mueller et al. . |
| 5,465,291 | 11/1995 | Barrus et al. . |
| 5,664,110 | 9/1997 | Green et al. . |

*Primary Examiner*—Harold I. Pitts
*Attorney, Agent, or Firm*—Mackall, Crounse & Moore, PLC

[57] ABSTRACT

A remote ordering system for a restaurant drive-through lane, consisting of an input device having a keypad, a battery, a first memory, a first processor, and a transmitter; and a drive-up ordering station adjacent the restaurant drive-through lane and unconnected to the input device, the ordering station having a posted visual menu, a receiver tuned to the transmitter, a second processor adapted to decode information received from the transmitter through the receiver and produce decoded information, a display to display the decoded information, a second memory to store item numbers and prices, and a communications link to a point-of-sale system. Preferably, the remote device is hand-held and operated from within the vehicle. A data processing method for ordering menu items from a vehicle at the drive-up lane of a restaurant, includes the steps of:

(a) displaying a welcome screen on a display on a drive-up ordering station adjacent the restaurant's drive-up lane;
(b) sending a start signal from a remote device in the vehicle to the drive-up ordering station;
(c) displaying an enter item number screen on the display;
(d) sending an item number from the remote device to the display;
(e) displaying an item identifier and quantity screen on the display;
(f) sending an item quantity from the remote device to the drive-up ordering station;
(g) calculating an item total and displaying an item total screen on the display;
(h) displaying an enter/remove/finish screen on the display;
(i) optionally repeating steps (c) throughj (h) for additional items;
(j) calculating an order total and displaying an order total screen on the display; and sending order information to a point-of-sale system connected to the drive-up ordering station.

13 Claims, 8 Drawing Sheets

Fig. 6a

ENTER ITEM NUMBER

ENTER ITEM NUMBER 1 2

PRESS ENTER BUTTON

Fig. 7

HAMBURGER QUANTITY 0 2

PRESS ENTER

Fig. 8

1. HAMBURGER - 2
TOTAL:

$1.75

PRESS ENTER BUTTON

Fig. 9

PRESS <u>ENTER</u> TO ORDER ITEM
PRESS <u>REMOVE</u> TO REMOVE ITEM
PRESS <u>FINISH</u> TO END

YOUR TOTAL IS:

<u>$4.73</u>

PLEASE PULL FORWARD

Fig. 11a

| ITEM | SELECTION | COUNT |
|------|-----------|-------|
| 01 | HAMBURGERS | 2 |
| 02 | FRENCH FRIES | 2 |
| 03 | MILK SHAKE | 1 |

SUBTOTAL $4.35
TAX $0.28
TOTAL $4.73

ENTER ITEM NUMBER TO REMOVE 0 1

PRESS ENTER BUTTON

Fig. 11b

| ITEM | SELECTION | COUNT | SUBTOTAL |
|------|-----------|-------|----------|
| 01 | HAMBURGERS | 2 | $2.05 |
| 02 | FRENCH FRIES | 2 | $1.30 |
| 03 | MILK SHAKE | 1 | $1.00 |

SUBTOTAL $4.35
TAX $0.28
TOTAL $4.73

ENTER ITEM NUMBER TO REMOVE 0 1

PRESS ENTER BUTTON 5,969,968

REMOTE ORDERING SYSTEM FOR RESTAURANT DRIVE-UP LANE

BACKGROUND OF THE INVENTION

This invention relates to a remote ordering system for a restaurant drive-through lane.

The drive-through lanes in many restaurants have added a very beneficial feature for both the consumer and the proprietor. The drive-through allows the proprietor to remain open longer, while the restaurant is being cleaned for the next day. The drive-through also allows more efficient handling of customers with a reduction in staff count.

The customer gets the benefit of staying in his or her vehicle while being serviced. This is especially important to young families and to those with mobility problems, such as the aged or infirm.

Drive-through lanes have been around for quite some time. However, in the typical drive-through lane, a customer places an order by speaking into a microphone to a an attendant. The quality of these microphones is generally poor, resulting in miscommunication and errors in the order. By the time the customer finds out about the error, he has already waited in line several minutes and must then wait several more minutes for a correct order to be filled. This results in the loss of customer goodwill.

A problem with previous drive-through ordering systems that do not use a microphone is that they require the customer to lean out of the vehicle to press a button on a menu or use a touch screen. This is awkward if not impossible for some people, such as very obese people. Also, this exposes the customer to rain, snow, etc. while the order is being placed. Generally speaking, there is no feedback as to the type, quantity, or total price of items ordered, and no capability to back up to correct an incorrectly-entered item.

There is a need for a remote ordering system for a drive-through lane that addresses the above problems. Additionally, the system should provide a completely transportable, hand-held remote device that can be assigned to customers who order frequently from the restaurant. Optimally, the device will have a customer identification which is transmitted with each order so that the restaurant can perform statistical analysis.

SUMMARY OF THE INVENTION

A remote ordering system for a restaurant drive-through lane, consisting of an input device having a keypad, a battery, a first memory, a first processor, and a transmitter; and a drive-up ordering station adjacent the restaurant drive-through lane and unconnected to the input device, the ordering station having a posted visual menu, a receiver tuned to the transmitter, a second processor adapted to decode information received from the transmitter through the receiver and produce decoded information, a display to display the decoded information, a second memory to store item numbers and prices, and a communications link to a point-of-sale system. Preferably, the remote device is hand-held and operated from within the vehicle. A data processing method for ordering menu items from a vehicle at the drive-up lane of a restaurant, includes the steps of:

(a) displaying a welcome screen on a display on a drive-up ordering station adjacent the restaurant's drive-up lane;

(b) sending a start signal from a remote device in the vehicle to the drive-up ordering station;

(c) displaying an enter item number screen on the display;

(d) sending an item number from the remote device to the display;

(e) displaying an item identifier and quantity screen on the display;

(f) sending an item quantity from the remote device to the drive-up ordering station;

(g) calculating an item total and displaying an item total screen on the display;

(h) displaying an enter/remove/finish screen on the display;

(i) optionally repeating steps (c) throughj (h) for additional items;

(j) calculating an order total and displaying an order total screen on the display; and (k) sending order information to a point-of-sale system connected to the drive-up ordering station.

A principal object and advantage of the present invention is that it allows the customer to order items from a menu in a drive-through lane without the necessity to speak to an attendant. This results in more accurate orders.

Another object and advantage of the present invention is that the customer may enter the order on a hand-held device within the vehicle without opening a window and leaning out of the vehicle.

Another object and advantage of the present invention is that it provides feedback to the customer on each item entered and the quantity of each item, as well as the total price of the order.

Another object and advantage of the present invention is that it allows the customer to back up and edit or delete one item out of several items in the order.

Another object and advantage of the present invention is that it allows the restaurant owner to assign a hand-held device to each customer who orders frequently, and to track each customer's ordering habits through a customer identification coded into the device.

BRIEF DESCRIPTION OF THE DRAWINGS

FIG. 6A is a schematic of an "enter item number" display.

FIG. 6B shows the "enter item number" display after an item number has been entered.

FIG. 7 is a schematic of an "item identifier and quantity" screen with the item quantity filled in by the customer.

FIG. 8 is a schematic of an "item total" screen.

FIG. 9 is a schematic of an "enter/remove/finish" screen.

FIG. 10 is a schematic of an "order total" screen.

FIG. 11A is a schematic of one embodiment of a "remove item" screen.

FIG. 11B is a schematic of another embodiment of a "remove item" screen.

DETAILED DESCRIPTION OF THE PREFERRED EMBODIMENTS

Figure 1:
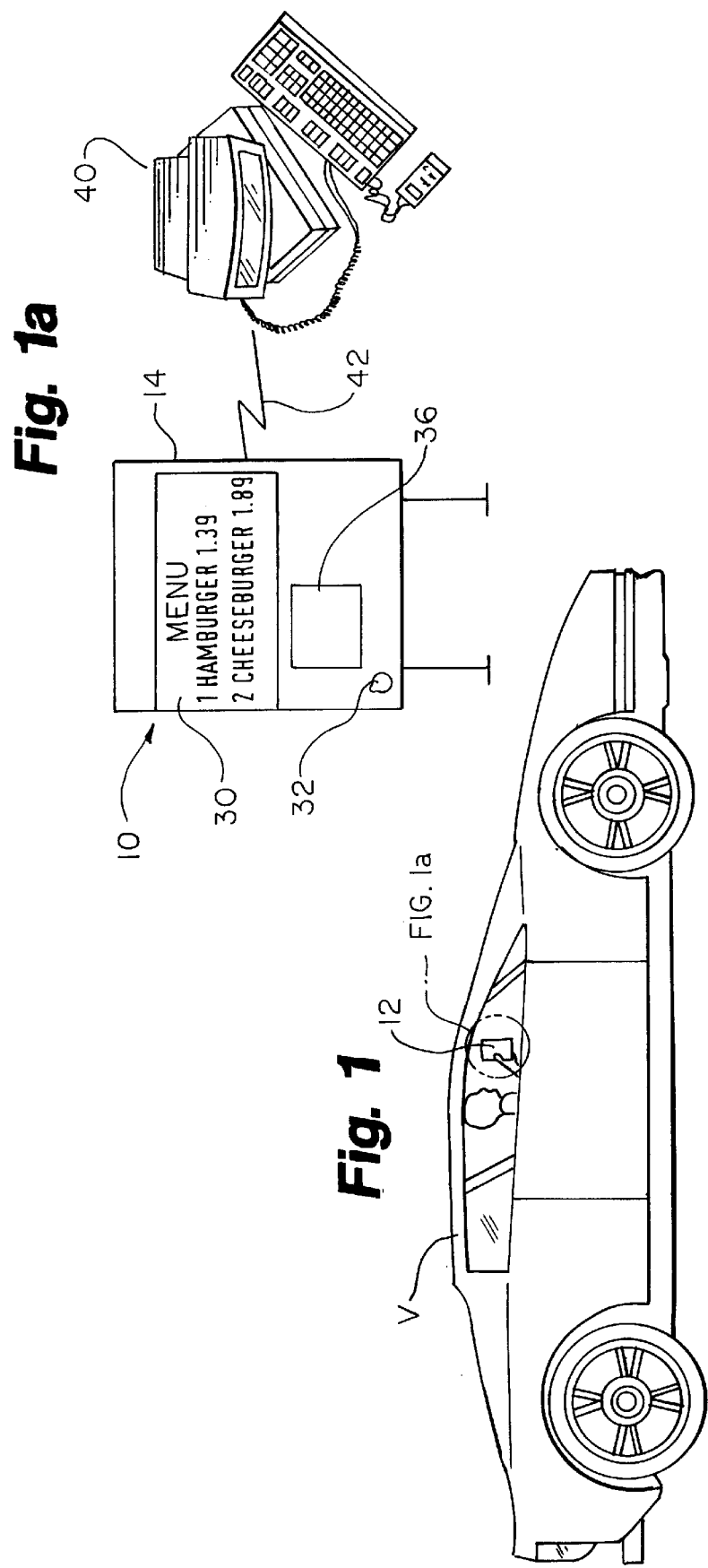
FIG. 1 is a schematic of the present invention shown in the context of a restaurant drive-through lane.

The remote ordering system for a restaurant drive-through lane of the present invention is generally designated in the Figures as reference numeral 10.

The remote ordering system 10 comprises an input device 12 and a drive-up ordering station 14. The input device 12 is unconnected to the drive-up ordering station 14, and the input device is used from inside the vehicle V. Preferably, the input device 12 is hand-held and is transportable away from the drive-up ordering station 14. Multiple devices 12 may be used, with a separate device being assigned to each customer. The input device 12 is preferably used within direct line-of-sight of the drive-up ordering station 14. That is, it is not intended that the devices operate while greatly separated, as for example over a telephone network.

Figure 3:
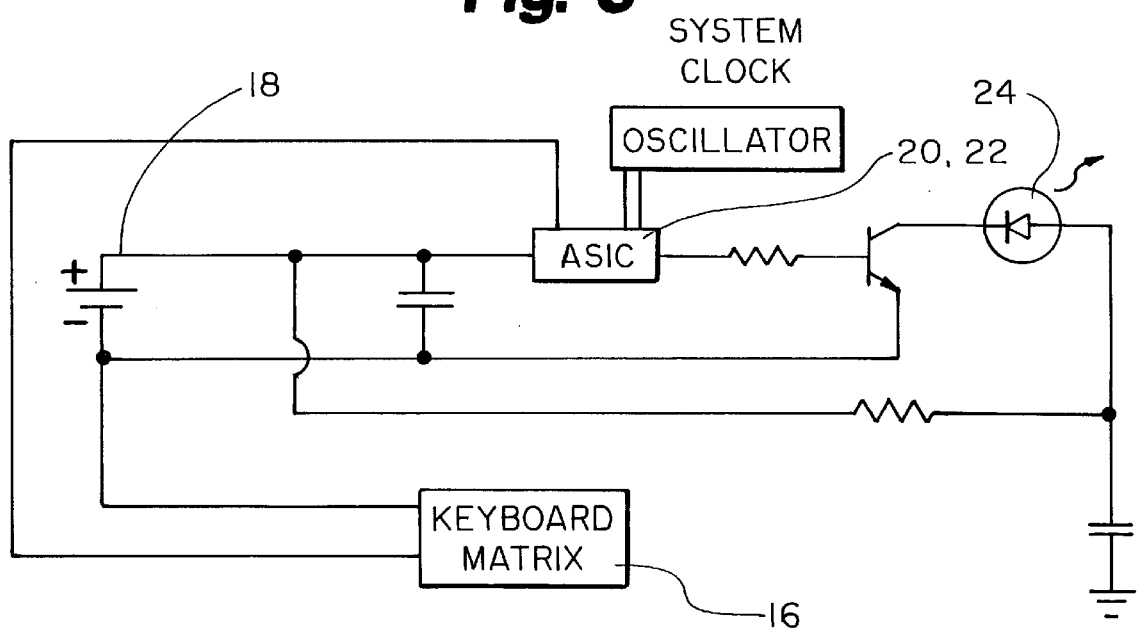
FIG. 3 is an electrical block diagram of the components of the remote hand-held device.

Preferably, the input device 12 has a keypad 16, battery 18, a first memory 20, a first processor 22, and a transmitter 24. The first memory 20 and first processor 22 may be discrete components, or they may both be in an Application Specific Integrated Circuit (ASIC) as seen in FIG. 3. A customer identification number may be stored in the first memory 20 for transmission to the drive-up ordering station with the order.

Figure 2:
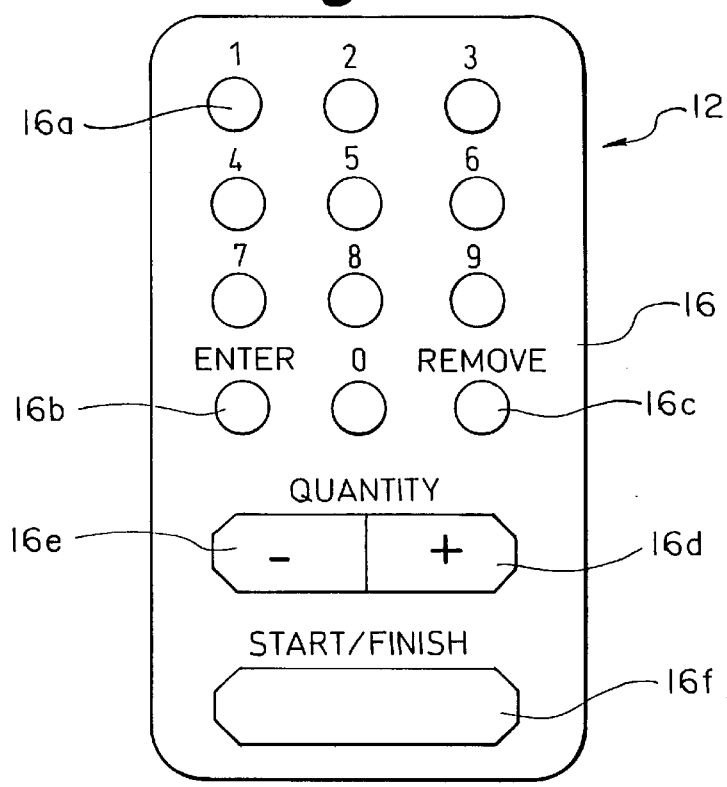
FIG. 2 is a schematic of the remote hand-held device of the present invention.

They keypad 16 further preferably comprises a number of numeric keys 16a, an enter key 16b, a remove key 16c, a quantity add key 16d, a quantity subtract key 16e, and a start/finish key 16f, as seen in FIG. 2.

Figure 4:
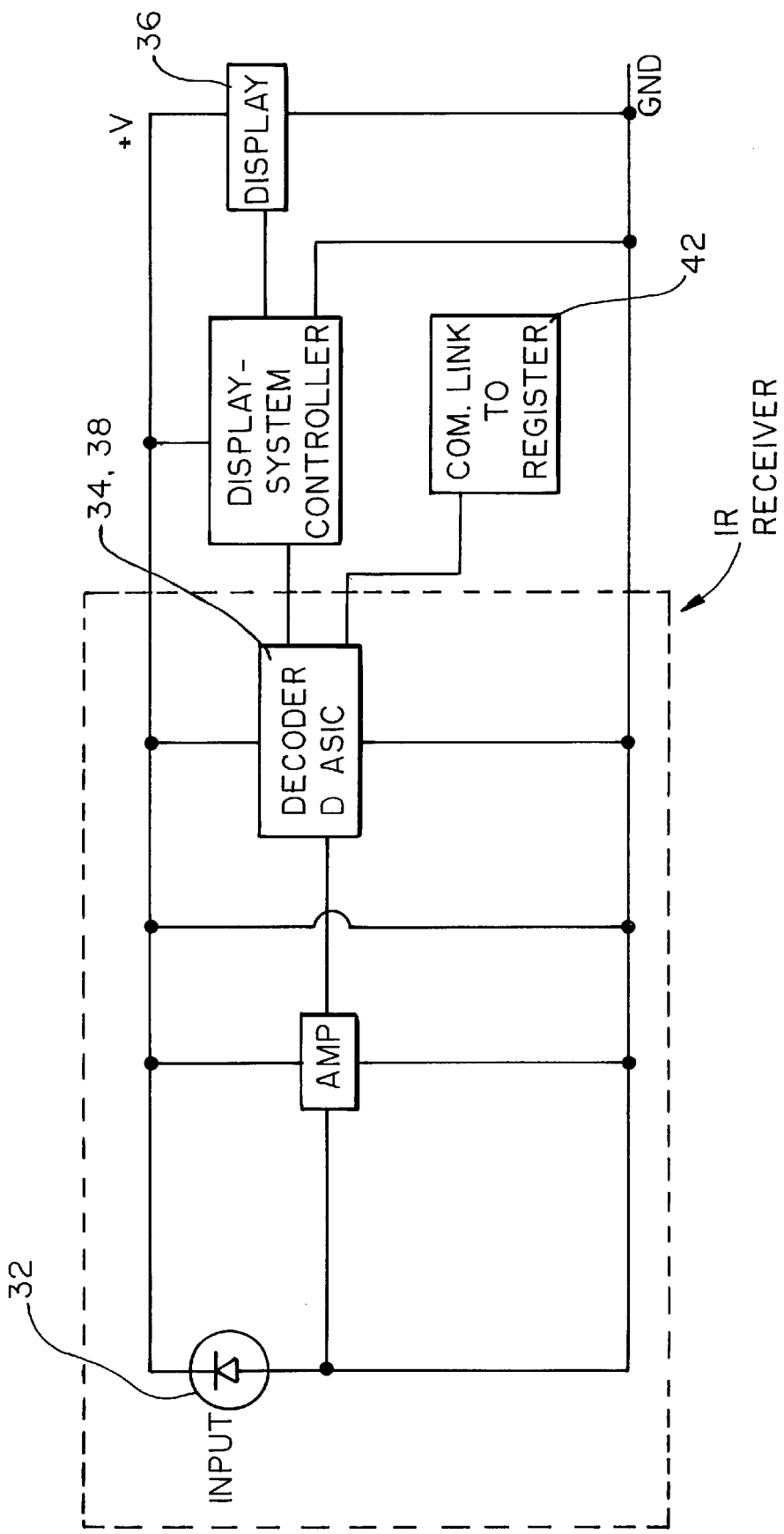
FIG. 4 is an electrical block diagram of the components of the drive-through station.

The drive-up ordering station 14 has a posted visual menu 30 which has the description and order number of various food items. A receiver 32 is tuned to the transmitter 24. The station 14 also has a second processor 34 which is adapted to decode information received from the transmitter 24 through the receiver 32 and produce decoded information. The decoded information, for example, item description and price, is displayed on a display 36. A second memory 38 stores item numbers, descriptions, and prices which may be received from a point-of-sale system 40 through a communications link 42. The second memory 38 and second processor 34 may be discrete components, or they may both be in an Application Specific Integrated Circuit (ASIC) as seen in FIG. 4.

The transmitter 24 and receiver 32 may operate either with radio frequency (RF) transmissions or with infrared (IR) transmissions.

Figure 5:
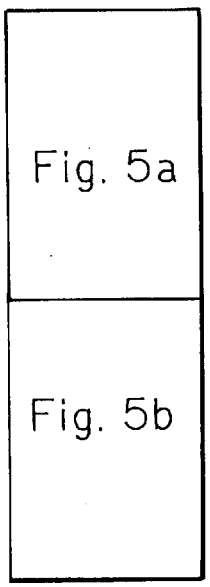
FIG. 5 is a flowchart of the data processing method of the present invention.
Figure 5A:
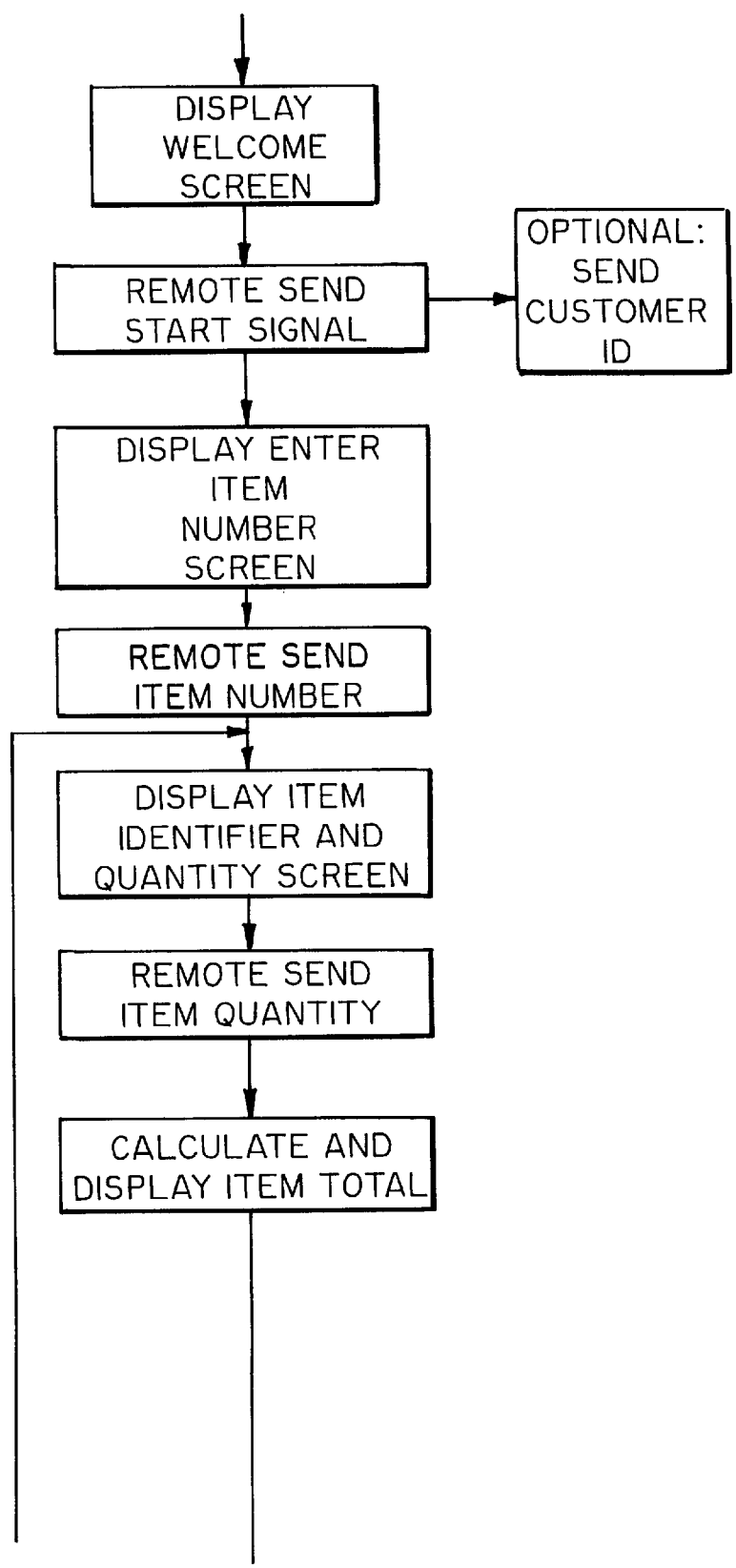
Figure 5B:
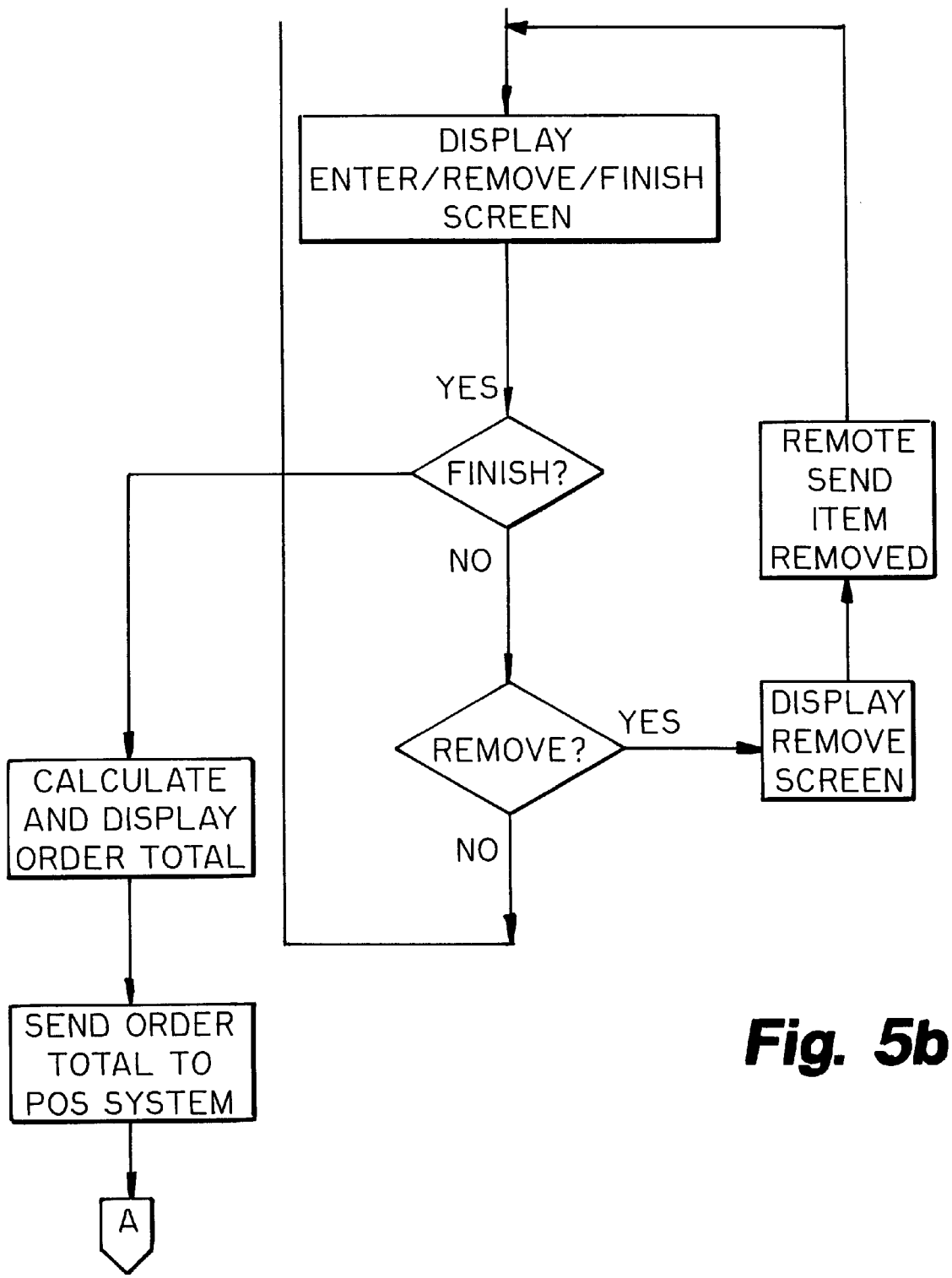

The remote ordering system 10 further comprises remote software executing in the first processor 22 and managing the remote input device 12; and ordering station software executing in the second processor 34 managing the ordering station 14. A flowchart of the remote software and ordering station software is shown in FIG. 5.

First, the ordering station software displays a "welcome" screen on the display 36. The welcome screen may invite the customer to initiate a transaction by pressing the start key 16f on the remote device 12.

The customer then presses the start key 16f on the remote device 12, causing a signal to be sent from the transmitter 24 to the receiver 32. The start signal is decoded by the ordering station software executing in the second processor 34. Optionally, a customer identification may be sent with the start signal or as a separate transmission.

In the next step, the ordering station software causes an "enter item number" screen (FIG. 6A) to be displayed on the display 36. The item numbers available to the customer will be shown on the posted menu 30 along with a description of the item (hamburger, cheeseburger, etc.) associated with the item number.

In response to the "enter item number screen", the customer presses one or more of the numeric keys 16a to input the item number. (FIG. 6B) The customer then initiates transmission of the item number to the ordering station 14 by, for example, pressing the "enter" key 16b.

The item number is received by the receiver 32 and decoded by the ordering station software executing in the second processor 34. The ordering station software then associates the item number with an item description by looking in a table held in the second memory 38.

Next, the ordering station software sends an "item identifier and quantity" screen (FIG. 7) to the display 36. This screen invites the customer to enter the quantity of this item desired.

The customer inputs the quantity of this item desired by using the numeric keys 16a and optionally the quantity add key 16d and/or quantity subtract key 16e. The customer then initiates transmission of the item quantity by, for example, pressing the "enter" key 16b.

The receiver 32 receives the item quantity for the first item and passes this to the second processor 34 for decoding. The second processor then makes an entry for the quantity of the first item in the second memory 38. The second processor looks up the price of this item from a table maintained in the second memory 38 and calculates an item total for the first item. The ordering station software then transmits an item total screen (FIG. 8) for the first item to the display 36.

When the customer presses the "enter" key again, a transmission signalling pressing of the "enter" key is sent to the ordering station 14. The ordering station software then transmits an "enter/remove/finish" screen (FIG. 9) to the display 36.

The customer has three choices by which he may respond to the "enter/remove/finish" screen.

If the "enter" key is pressed, the remote device 12 signals the ordering station 14 to bring up an "enter item number" screen (FIG. 6A) to begin the process described above for ordering another item.

If the "remove" key 16c is pressed, the remote device 12 signals the ordering station to bring up a "remove item" screen (FIG. 11A). This screen will list the item(s) ordered by item number, description, and quantity and display an order total. Optionally, the order subtotals may also be displayed (FIG. 11B). By using the numeric keys 16a, the customer indicates which item number to remove, then presses the "enter" key to signal the ordering station software to remove that item from the order. The ordering station software then redisplays the "enter/remove/finish" screen.

If the "finish" key 16f is pressed, the remote device 12 signals the ordering station to calculate an order total for all items and quantities ordered. The ordering station software then causes an order total screen (FIG. 10) to be displayed on the display 36.

The ordering station software then sends the order information to the point-of-sale system via the communications link 42.

The point-of-sale system may load item numbers, descriptions, and prices into the ordering station through the communication link 42.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A remote ordering system for a restaurant drive-through lane, comprising:

(a) an input device having a keypad, a battery, a first memory, a first processor, and a transmitter; and (b) a drive-up ordering station adjacent the restaurant drive-through lane and unconnected to said input device, said ordering station having a posted visual menu, a receiver tuned to said transmitter, a second processor adapted to decode information received from said transmitter through said receiver and produce decoded information, a display adapted to display said decoded information, a second memory adapted to store item numbers and prices, and a communications link to a point-of-sale system.

2. The remote ordering system of claim 1, further comprising a plurality of said input devices, each of said plurality of input devices being separately transportable away from said drive-up ordering station.

3. A remote ordering system for a restaurant drive-through lane, comprising:

(a) a hand-held input device having a keypad, a battery, a first memory, a first processor, and a transmitter; and (b) a drive-up ordering station adjacent the restaurant drive-through lane and unconnected to said hand-held input device, said ordering station having a posted visual menu, a receiver tuned to said transmitter, a second processor adapted to decode information received from said transmitter through said receiver and produce decoded information, a display adapted to display said decoded information, a second memory adapted to store item numbers and prices, and a communications link to a point-of-sale system, (c) said hand-held input device transmitting an order to said drive-up ordering station while said hand-held input device is within direct line-of-sight of said drive-up ordering station.

4. The remote ordering system of claim 3, further comprising remote software executing in the first processor and adapted to manage the remote input device; and ordering station software executing in the second processor and adapted to manage the drive-up ordering station.

5. The remote ordering system of claim 3, wherein said keypad further comprises a number of numeric keys, an enter key, a remove key, a quantity add key, a quantity subtract key, and a start/finish key.

6. The remote ordering system of claim 3, wherein said transmitter and said receiver operate with radio frequency transmissions.

7. The remote ordering system of claim 3, wherein said transmitter and said receiver operate with infrared transmissions.

8. The remote ordering system of claim 3, further comprising a plurality of said hand-held devices, each of said plurality of hand-held devices being separately transportable away from said drive-up ordering station.

9. The remote ordering system of claim 3, wherein said first memory contains a customer identification number.

10. The remote ordering system of claim 9, wherein said remote software and said ordering station software cooperatively execute the steps of:

(a) displaying a welcome screen on the display;

(b) responding to activation of said start key by sending a start signal from said transmitter to said receiver;

(c) displaying an enter item number screen on the display;

(d) responding to activation of said numeric keys by sending an item number from said transmitter to said receiver;

(e) displaying an item number on said display;

(f) responding to activation of said enter key by displaying an item identifier and quantity screen on said display;

(g) responding to activation of said numeric keys by sending an item quantity from said transmitter to said receiver;

(h) calculating an item total and displaying an item total screen on said display;

(i) responding to activation of said enter key by displaying an enter/remove/finish screen on said display;

(j) responding to activation of said remove key by displaying a remove item screen;

(k) responding to activation of said enter key by repeating steps (e) through (i);

(l) responding to activation of said finish key by calculating an order total and displaying an order total screen on said display; and (m) sending order information to the point-of-sale system.

11. The remote ordering system of claim 6, further comprising a step of sending said customer identification number from said transmitter to said receiver and sending said customer identification number to the point-of-sale system.

12. A data processing method for ordering menu items from a vehicle at the drive-up lane of a restaurant, comprising the steps of:

(a) displaying a welcome screen on a display on a drive-up ordering station adjacent the restaurant's drive-up lane;

(b) sending a start signal from a remote device in the vehicle to said drive-up ordering station;

(c) displaying an enter item number screen on the display;

(d) sending an item number from said remote device to said display;

(e) displaying an item identifier and quantity screen on said display;

(f) sending an item quantity from said remote device to said drive-up ordering station;

(g) calculating an item total and displaying an item total screen on said display;

(h) displaying an enter/remove/finish screen on said display;

(i) optionally repeating steps (c) throughj (h) for additional items;

(j) calculating an order total and displaying an order total screen on said display; and (k) sending order information to a point-of-sale system connected to said drive-up ordering station.

13. The method of claim 12, further comprising a step of sending a customer identification number from said remote device to said drive-up ordering station and sending said customer identification number to said point-of-sale system.

* * * * *